United States Patent
Chen et al.

(10) Patent No.: US 6,760,507 B2
(45) Date of Patent: Jul. 6, 2004

(54) OPTICAL DEVICE

(75) Inventors: Huan-Kun Chen, Taoyuan (TW); Yu-Chuan Chen, Taoyuan (TW)

(73) Assignee: Delta Electronics, Inc. (TW)

( * ) Notice: Subject to any disclaimer, the term of this patent is extended or adjusted under 35 U.S.C. 154(b) by 33 days.

(21) Appl. No.: 10/216,416

(22) Filed: Aug. 9, 2002

(65) Prior Publication Data

US 2003/0198431 A1 Oct. 23, 2003

(30) Foreign Application Priority Data

Apr. 18, 2002 (TW) ........................................ 91107927 A

(51) Int. Cl.[7] ............................. G02B 6/26; G02B 6/42; H04J 14/02
(52) U.S. Cl. ............................. 385/18; 385/19; 398/85
(58) Field of Search ..................... 385/16–19; 398/43, 398/45, 48, 79, 83, 85

(56) References Cited

U.S. PATENT DOCUMENTS

| | | | | |
|---|---|---|---|---|
| 5,812,291 A | * | 9/1998 | Bendelli et al. ............... | 398/85 |
| 5,822,095 A | * | 10/1998 | Taga et al. .................... | 398/85 |
| 6,219,474 B1 | * | 4/2001 | Cai et al. ....................... | 385/24 |
| 6,275,312 B1 | * | 8/2001 | Derks et al. ................... | 398/9 |
| 6,498,682 B2 | * | 12/2002 | Glance ......................... | 359/578 |
| 6,504,968 B1 | * | 1/2003 | Zhu et al. ..................... | 385/18 |
| 6,587,608 B2 | * | 7/2003 | Cormack ...................... | 385/16 |
| 2002/0085253 A1 | * | 7/2002 | Zhang et al. ............... | 359/127 |
| 2002/0181876 A1 | * | 12/2002 | Chang ......................... | 385/47 |

* cited by examiner

Primary Examiner—Edward J. Glick
Assistant Examiner—Thomas R Artman
(74) Attorney, Agent, or Firm—Fulbright & Jaworski LLP

(57) ABSTRACT

An optical device is provided, including two dual-fiber collimators, two single-fiber collimators, two filters connected respectively to the two dual collimators, and two mirrors. The two dual-fiber collimators are interconnected by coupling an optical fiber thereof to each other. One mirror is fixed in position, and the other mirror is mounted on a mechanism capable of moving up and down so as to switch an optical path.

15 Claims, 5 Drawing Sheets

FIG. 2

10 input $\lambda_1, \lambda_2 \sim \lambda_n$  add $\lambda_1$  drop $\lambda_1$  $\lambda_2 \sim \lambda_n$  output $\lambda_1, \lambda_2 \sim \lambda_n$

FIG. 3

10 input $\lambda_1, \lambda_2 \sim \lambda_n$  add $\lambda_1$  drop $\lambda_1$  $\lambda_2 \sim \lambda_n$  output $\lambda_1, \lambda_2 \sim \lambda_n$

OPTICAL DEVICE

FIELD OF THE INVENTION

The present invention relates to optical devices, and more particularly, to a reconfigurable optical add/drop multiplexer (ROADM) applied to optical transmission networks.

BACKGROUND OF THE INVENTION

A conventional optical add/drop multiplexer (OADM), as shown in FIG. 1, is widely applied to optical transmission networks for adding or dropping optical wavelength signals at network nodes for data exchange. In response to increase in number of available wavelengths for each optical fiber in the optical transmission networks, the optical add/drop multiplexer should be designed to be capable of processing a wider range of wavelengths. Optical add/drop multiplexers are generally classified as fixed-type OADMs and reconfigurable-type OADMs (ROADMs). A fixed-type OADM transmits an upstream or downstream signal of a fixed wavelength at a network node, and a ROADM regulates the wavelength of the upstream or downstream signal at the network node, so as to evenly distribute network wavelength resources and thus to improve network dataflow capacity.

Therefore, ROADMs that provide dynamic reconfiguring ability for optical transmission networks, thus become actively-developed products by manufacturers.

SUMMARY OF THE INVENTION

A primary objective of the present invention is to provide a ROADM optical device applicable to an optical transmission network, which ROADM optical device is assembled by at least a fiber collimator, a filter, and an optical element for forming a 2×2 optical path switch.

In accordance with the above and other objectives, the present invention provides an optical device, comprising: a first input end for receiving a multiple-wavelength optical signal, wherein the multiple-wavelength optical signal includes an optical signal to be dropped, and the first input end has a first filter that is capable of isolating the optical signal to be dropped, from the multiple-wavelength optical signal; a second input end for receiving an optical signal to be added, which has the same wavelength as the optical signal to be dropped; a first output end; a second output end coupled to the first input end, and having a second filter for allowing the optical signal to be dropped and the optical signal to be added to pass therethrough; and a switching member.

When the switching member is situated at a first position, the first output end outputs the optical signal to be dropped that passes through the first filter, and the second output end outputs the optical signal to be added and the multiple-wavelength optical signal exclusive of the optical signal to be dropped. When the switching member is situated at a second position, the second output end outputs the multiple-wavelength optical signal exclusive of the optical signal to be dropped and the optical signal to be dropped that passes through the first filter, and the first output end outputs the optical signal to be added.

BRIEF DESCRIPTION OF THE DRAWINGS

The present invention can be more fully understood by reading the following detailed description of the preferred embodiments, with reference made to the accompanying drawings, wherein:

FIG. 2 is a schematic diagram of an optical device according to a first preferred embodiment of the invention, FIG. 3 is a schematic diagram of the optical device shown in FIG. 2 with a switched optical path;

DETAILED DESCRIPTION OF THE PREFERRED EMBODIMENTS

Figure 1:
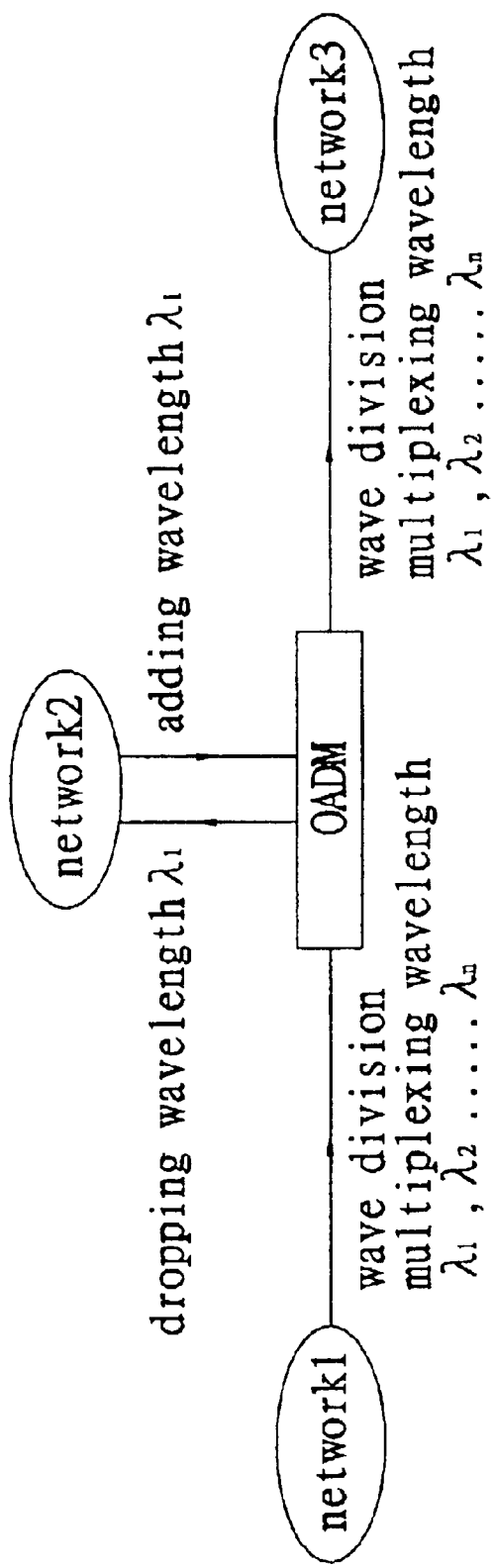
FIG. 1 (PRIOR ART) is a schematic diagram of a conventional optical add/drop multiplexer applied to optical transmission networks.

FIGS. 2 and 3 illustrate an optical device 10 according to a first preferred embodiment of the present invention. This optical device 10 comprises two dual-fiber collimators 101, 104, two single-fiber collimators 102, 103, two filters 105, 106, and two reflective mirrors 107, 108. The two filters 105, 106 are mounted in front of the dual-fiber collimators 101, 104, or the filters 105, 106 are connected to the dual-fiber collimators 101, 104, respectively Alternatively, surfaces of the dual-fiber collimators 101, 104 are subject to a film-coating treatment. An optical fiber from the dual-fiber collimator 101 and an optical fiber from the dual-fiber collimator 104 are interconnected to form a combined optical fiber 117. Besides, the reflective mirror 107 is fixed in position, and the reflective mirror 108 is assembled on an up-and-down movable mechanism (not shown) for allowing the reflective mirror 108 to switch an optical path.

As shown in FIG. 2, when wavelength-division-multiplexing (WDM) wavelengths $\lambda_1, \lambda_2 \ldots \lambda_n$ are inputted to an optical fiber 113 connected to the dual-fiber collimator 101, the filter 105 allows a selected wavelength (such as $\lambda_1$) to pass therethrough, but reflects other wavelengths (such as $\lambda_2 \ldots \lambda_n$) back to the dual-fiber collimator 101 to be coupled to the optical fiber 117. The wavelength $\lambda_1$ passing through the filter 105 is subject to reflection twice by a first optical surface of the reflective mirror 107 and once by a second optical surface of the reflective mirror 108, and then enters into the dual-fiber collimator 104 to be outputted via an optical fiber 116 coupled to the dual-fiber collimator 104. The wavelengths $\lambda_2 \ldots \lambda_n$ coupled to the optical fiber 117 also enter into the dual-fiber collimator 104 and are reflected by the filter 106, so as to allow the wavelengths $\lambda_2 \ldots \lambda_n$ to be outputted via the optical fiber 116. The wavelength $\lambda_1$ added to an optical fiber 114 connected to the single-fiber collimator 102, is reflected by a first optical surface of the reflective mirror 108 and then enters into the single-fiber collimator 103 to be dropped out from an optical fiber 115 coupled to the single-fiber collimator 103 The above description depicts a non-operating situation of the optical device 10, wherein an input/output network does not interfere with an add/drop network.

As shown in FIG. 3, when the reflective mirror 108 is removed, the wavelength $\lambda_1$ passing through the filter 105 is reflected by the first optical surface of the reflective mirror 107, and enters into the single-fiber collimator 103 to be dropped out via the optical fiber 115 connected to the single-fiber collimator 103. The wavelength $\lambda_1$ added to the optical fiber 114 connected to the single-fiber collimator 102, is reflected by the first optical surface of the reflective mirror 107, and enters into the dual-fiber collimator 104 to be outputted via the optical fiber 116 coupled to the dual-fiber collimator 104. Besides, the filters 105, 106 reflect the wavelengths $\lambda_2 \ldots \lambda_n$, so as to allow the wavelengths $\lambda_2 \ldots \lambda_n$ to be coupled to and outputted via the optical fiber 116 Therefore, optical wavelength signals can be desirably dropped from or added to an optical transmission network through the use of the optical device 10.

Figure 4:
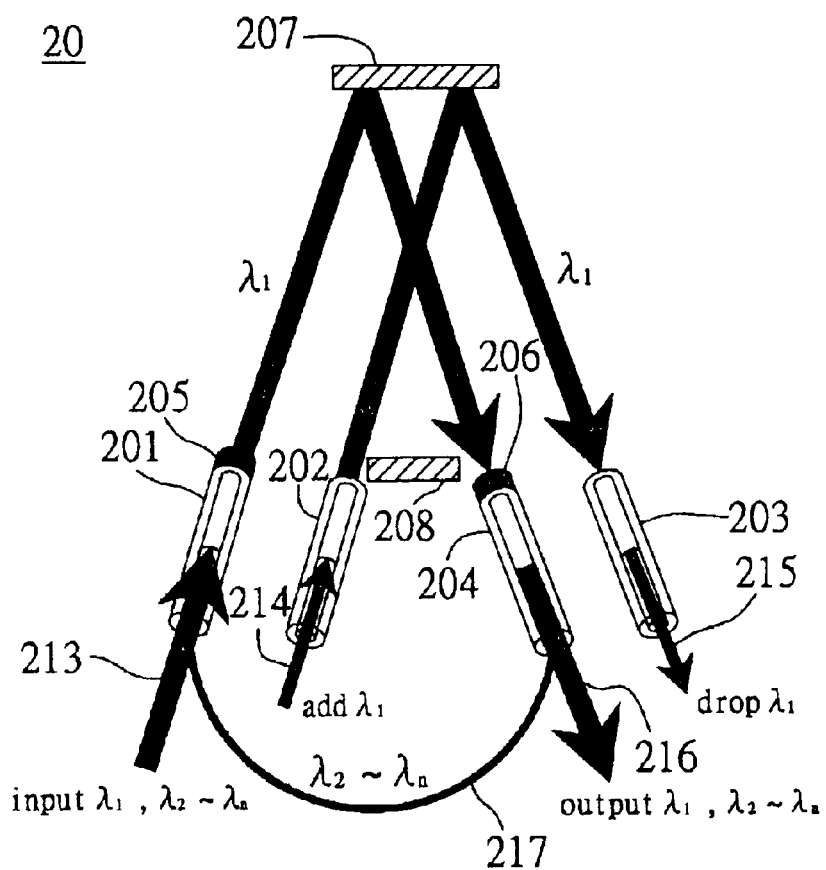
FIG. 4 is a schematic diagram of an optical device according to a second preferred embodiment of the invention.
Figure 5:
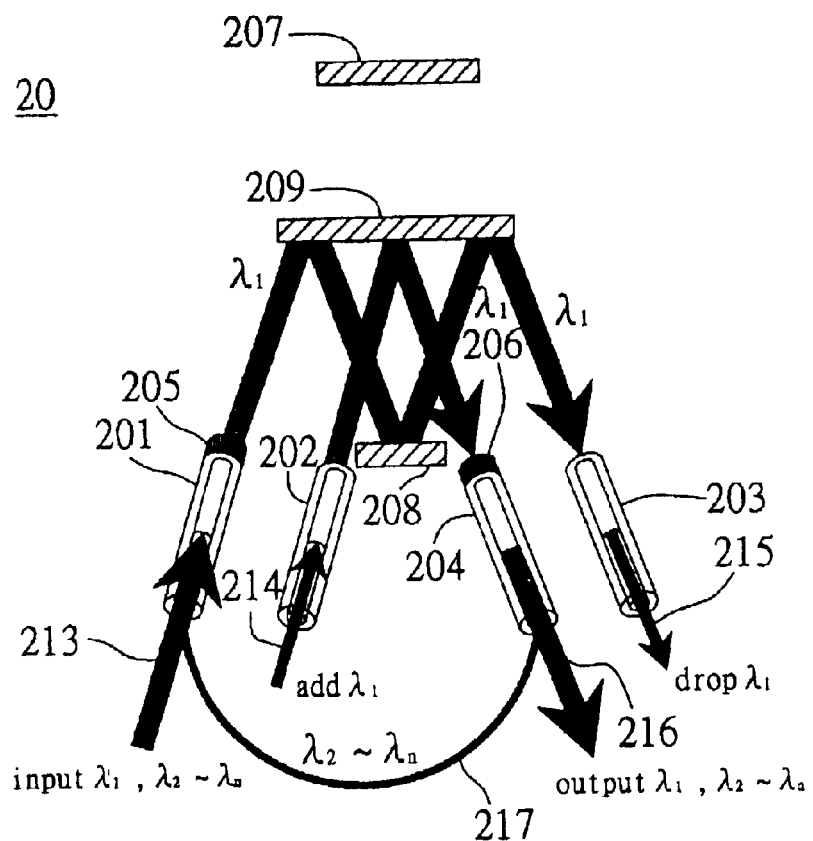
FIG. 5 is a schematic diagram of the optical device shown in FIG. 4 with a switched optical path.

FIGS. 4 and 5 illustrate an optical device 20 according to a second preferred embodiment of the invention. This optical device 20 comprises: two dual-fiber collimators 201, 204, two single-fiber collimators 202, 203, two filters 205, 206, and three reflective mirrors 207, 208, 209. The fiber collimators 201, 202, 203, 204 and the filters 205, 206 are assembled in the same manner as described in the first embodiment. The reflective mirrors 207, 208 are fixed in position, and the reflective mirror 209 is assembled on an up-and-down movable mechanism (not shown) for allowing the reflective mirror 209 to switch an optical path As shown in FIG. 4, when WDM wavelengths $\lambda_1$, $\lambda_2 \ldots \lambda_n$ are inputted to an optical fiber 213 connected to the dual-fiber collimator 201, the filter 205 allows a selected wavelength (such as $\lambda_1$) to pass therethrough, and reflects other wavelengths (such as $\lambda_2 \ldots \lambda_n$) back to the dual-fiber collimator 201 to be coupled to an optical fiber 217. The wavelength $\lambda_1$ passing through the filter 205 is reflected by a first optical surface of the reflective mirror 207, and then enters into the dual-fiber collimator 204 to be outputted via an optical fiber 216 connected to the dual-fiber collimator 204. The wavelengths $\lambda_2 \ldots \lambda_n$ coupled to the optical fiber 217 also enter into the dual-fiber collimator 204, and are reflected by the filter 206 to be coupled to and outputted via the optical fiber 216. The wavelength $\lambda_1$ added to an optical fiber 214 connected to the single-fiber collimator 202, is reflected by the first optical surface of the reflective mirror 207, and then enters into the single-fiber collimator 203 to be dropped out from an optical fiber 215 coupled to the single-fiber collimator 203 Therefore, under a non-operation condition of the optical device 20, an input/output network does not interfere with an add/drop network As shown in FIG. 5, with the reflective mirror 209 being added, the wavelength $\lambda_1$ that passes through the filter 205 is reflected twice by a first optical surface of the reflective mirror 209 and once by a first optical surface of the reflective mirror 208 to enter into the single-fiber collimator 203. Then, the wavelength $\lambda_1$ is dropped out via the optical fiber 215 connected to the single-fiber collimator 203 The wavelength $\lambda_1$ added to the optical fiber 214 connected to the single-fiber collimator 202, is reflected by the first optical surface of the reflective mirror 209, and then enters into the dual-fiber collimator 204 to be outputted via the optical fiber 216 of the dual-fiber collimator 204. Besides, the filters 205, 206 reflect the wavelengths $\lambda_2 \ldots \lambda_n$, so as to allow the wavelengths $\lambda_2 \ldots \lambda_n$ to be coupled to and outputted via the optical fiber 216. Therefore, optical wavelength signals can be desirably dropped from or added to an optical transmission network through the use of the optical device 20

FIGS. 6A, 6B, 7A and 7B illustrate an optical device 30 according to a third preferred embodiment of the invention.

This optical device 30 comprises: two dual-fiber collimators 301, 304, two single-fiber collimators 302, 303, two filters 305, 306, a specially film-coated flat glass 307, flat glass 308 with high permeability, and a prism 309 with high permeability The flat glass 307 is coated or attached on its bottom surface with a reflective film to form a reflective mirror 310, and a top surface of the flat glass 307 is coated or adhered at a predetermined position with a reflective film to form a reflective mirror 311. The prism 309 is also coated or adhered on a surface thereof with a reflective film to from a reflective mirror 312. The fiber collimators 301, 302, 303, 304 and the filters 305, 306 are assembled in the same manner as described in the first embodiment The flat glass 308 is assembled on a rotatable mechanism (not shown) for allowing the flat glass 308 to switch an optical path.

Figure 6A:
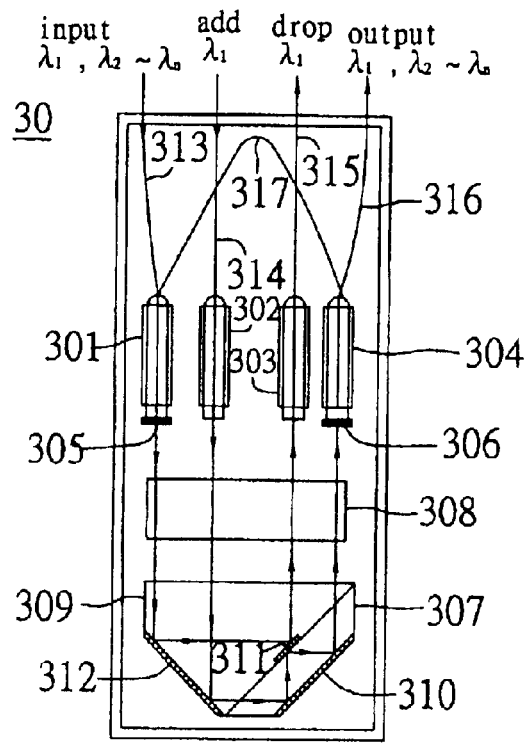
FIG. 6A is a front view of an optical device according to a third preferred embodiment of the invention.
Figure 6B:
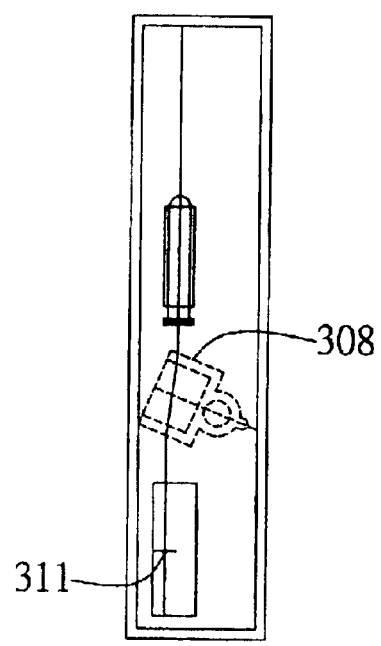
FIG. 6B is a side view of the optical device according to the third preferred embodiment of the invention.

As shown in FIG. 6A, when WDM wavelengths $\lambda_1$, $\lambda_2 \ldots \lambda_n$ are inputted to an optical fiber 313 connected to the dual-fiber collimator 301, the filter 305 allows a selected wavelength (such as $\lambda_1$) to pass therethrough, and reflects other wavelengths (such as $\lambda_2 \ldots \lambda_n$) back to the dual-fiber collimator 301 to be coupled to an optical fiber 317. When the flat glass 308 is rotated to reach a first position (as shown in FIG. 6B), the wavelength $\lambda_1$ that passes through the filter 305 is refracted by the flat glass 308, reflected by the reflective mirror 312, and further reflected by a first optical surface of the reflective mirror 311 so as to enter into the single-fiber collimator 303 where the wavelength $\lambda_1$ can be dropped out from an optical fiber 315 coupled to the single-fiber collimator 303. The wavelength $\lambda_1$ added to an optical fiber 314 connected to the single-fiber collimator 302, is refracted by the flat glass 308, reflected by the reflective mirror 312, and further reflected by the reflective mirror 310 and a second optical surface of the reflective mirror 311, so as to enter into the dual-fiber collimator 304 wherein the wavelength $\lambda_1$ can be dropped from an optical fiber 316 coupled to the dual-fiber collimator 304 Therefore, optical wavelength signals can be desirably dropped from or added to an optical transmission network through the use of the optical device 30.

Figure 7A:
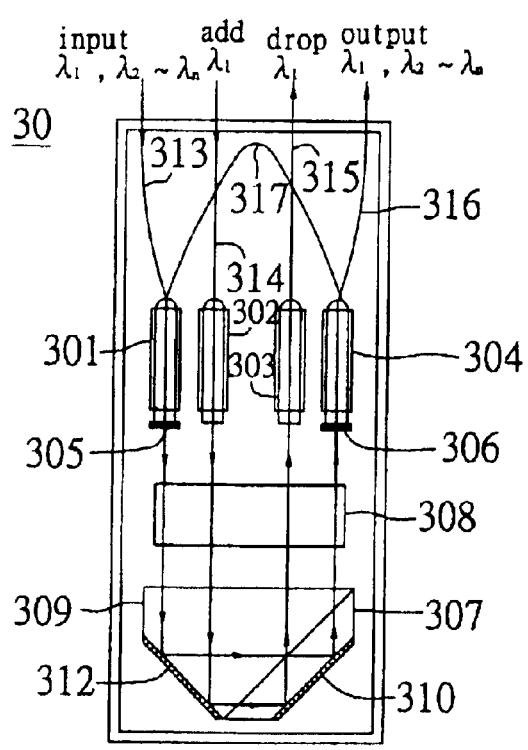
FIG. 7A is a front view of the optical device with a switched optical path according to the third preferred embodiment of the invention.
Figure 7B:
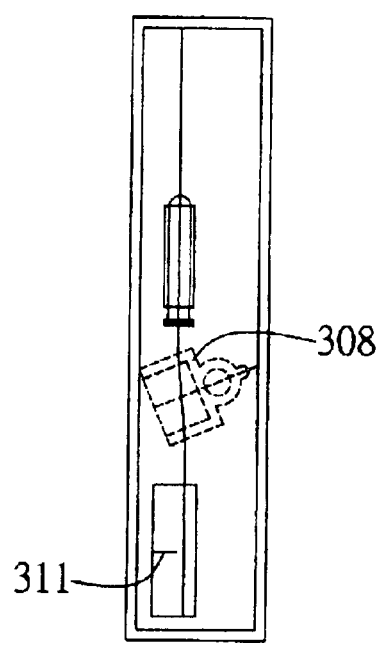
FIG. 7B is a side view of the optical device with a switched optical path according to the third preferred embodiment of the invention

As shown in FIGS. 7A and 7B, when the flat glass 307 is rotated to reach a second position, after being refracted by the flat glass 308 and reflected by the reflective mirror 312, the wavelength $\lambda_1$ that passes through the filter 305 is not reflected by the first optical surface of the reflective mirror 311, but is reflected directly by the reflective mirror 310 and enters into the dual-fiber collimator 304 where the wavelength $\lambda_1$ can be outputted via the optical fiber 316 coupled to the dual-fiber collimator 304. The wavelengths $\lambda_2 \ldots \lambda_n$ that are reflected by the filter 305 to be coupled to the optical fiber 317, enter into the dual-fiber collimator 304 and are reflected by the filter 306 to be coupled to and outputted via the optical fiber 316 The wavelength $\lambda_1$ that is added to the optical fiber 314 connected to the single-fiber collimator 316, after being refracted by the flat glass 308 and reflected by the reflective mirrors 312, 310, enters into the single-fiber collimator 303 where the wavelength $\lambda_1$ can be dropped out via the optical fiber 315 connected to the single-fiber collimator 303 Therefore, under a non-operation condition of the optical device 30, an input/output network does not interfere with an add/drop network.

In conclusion from the above embodiments, the ROADM optical device according to this invention is simply accomplished by assembling two dual-fiber collimators, two filters, two single-fiber collimators, and a set of optical elements for forming a 2×2 optical path switch.

The invention has been described using exemplary preferred embodiments However, it is to be understood that the scope of the invention is not limited to the disclosed embodiments. On the contrary, it is intended to cover various modifications and similar arrangements The scope of the claims, therefore, should be accorded the broadest interpretation so as to encompass all such modifications and similar arrangements

What is claimed is:

1. An optical device, comprising:
   a first input end for receiving a multiple-wavelength optical signal, wherein the multiple-wavelength optical signal includes an optical signal to be dropped, and the first input end has a first filter that is capable of isolating the optical signal to be dropped from the multiple-wavelength optical signal;
   a second input end for receiving an optical signal to be added, which has the same wavelength as the optical signal to be dropped;
   a first output end;
   a second output end coupled to the first input end, and having a second filter for allowing the optical signal to be dropped and the optical signal to be added to pass therethrough; and
   a switching member comprising a first reflective unit and a movable second reflective unit having a first reflective surface and a second reflective surface;
   wherein when the second reflective unit is situated at a first position, the optical signal to be dropped is reflected by the first reflective unit to enter into the first output end, and the optical signal to be added is reflected by the first reflective unit to enter into the second output end, and outputted together with the multiple-wavelength optical signal exclusive of the optical signal to be dropped via the second output end; and wherein when the second reflective unit is situated at a second position, the optical signal to be dropped is reflected by the first reflective unit and the first reflective surface of the second reflective unit to enter into the second output end, and outputted together with the multiple-wavelength optical signal exclusive of the optical signal to be dropped via the second output end, and the optical signal to be added is reflected by the second reflective surface of the second reflective unit to enter into the first output end.

2. The optical device according to claim 1, wherein the first input end further comprises:
   a first dual-fiber collimator having an optical fiber connected to the second output end.

3. The optical device according to claim 2 wherein the first filter is mounted in front of the first dual-fiber collimator.

4. The optical device ac cording to claim 2, wherein the first filter is a plated film coated on an end surface of the first dual-fiber collimator.

5. The optical device according to claim 2, wherein the second output end further comprises:
   a second dual-fiber collimator coupled to the optical fiber of the first dual-fiber collimator.

6. The optical device according to claim 5, wherein the second filter is mounted in front of the second dual-fiber collimator.

7. The optical device according to claim 5, wherein the second filter is a plated film coated on an end surface of the second dual-fiber collimator.

8. The optical device according to claim 1, wherein the second input end comprises a first single-fiber collimator, and the first output end comprises a second single-fiber collimator.

9. The optical device according to claim 1, wherein the first and second reflective units are each a reflective mirror.

10. An optical device comprising:
    a first input end for receiving a multiple-wavelength optical signal, wherein the multiple-wavelength optical signal includes an optical signal to be dropped, and the first input end has a first filter that is capable of isolating the optical signal to be dropped from the multiple-wavelength optical signal;
    a second input end for receiving an optical signal to be added, which has the same wavelength as the optical signal to be dropped;
    a first output end;
    a second output end coupled to the first input end and having a second filter for allowing the optical signal to be dropped and the optical signal to be added to pass therethrough; and
    a switching member comprising a first reflective unit, a second reflective unit, and a movable third reflective unit moving between the first reflective unit and the second reflective units;
    wherein when the third reflective unit is situated at the a first position, the optical signal to be dropped is reflected by the third reflective unit and the second reflective unit to enter into the first output end, and the optical signal to be added is reflected by the third reflective unit to enter into the second output end, and outputted together with the multiple-wavelength optical signal exclusive of the optical signal to be dropped via the second output end; and wherein when the third reflective unit is situated at a second position, the optical signal to be dropped is reflected by the first reflective unit to enter into the second output end, and outputted together with the multiple-wavelength optical signal exclusive of the optical signal to be dropped via the second output end, and the optical signal to be added is reflected by the first reflective unit to enter into the first output end.

11. The optical device according to claim 10, wherein the first, second and third reflective units are each a reflective mirror.

12. An optical device comprising:
    a first input end for receiving a multiple-wavelength optical signal, wherein the multiple-wavelength optical signal includes an optical signal to be dropped, and the first input end has a first filter that is capable of isolating the optical signal to be dropped from the multiple-wavelength optical signal;
    a second input end for receiving an optical signal to be added, which has the same wavelength as the optical signal to be dropped;
    a first output end;
    a second output end coupled to the first input end and having a second filter for allowing the optical signal to be dropped and the optical signal to be added to pass therethrough; and
    a switching member comprising a movable refractive unit, a first reflective unit, a second reflective unit having a first reflective surface and a second reflective surface, and a third reflective unit;
    wherein when the refractive unit is situated at a first position, the optical signal to be dropped is reflected by the first reflective unit and the first reflective surface of the second reflective unit to enter into the first output end, and the optical signal to be added is reflected by the first reflective unit, the second reflective surface of the second reflective unit and the third reflective unit to enter not the second output end, and outputted together with the multiple-wavelength optical signal exclusive of the optical signal to be dropped via the second output end; and wherein when the refractive unit is situated at a second position, the optical signal to be dropped is reflected by the first reflective unit and the third reflective unit to enter into the second output end, and outputted together with the multiple-wavelength optical signal exclusive of the optical signal to be dropped via the second output end, and the optical signal to be added is reflected by the first reflective unit and the third reflective unit to enter into the first output end.

13. The optical device according to claim 12, wherein the refractive unit is flat glass.

14. The optical device according to claim 12, wherein the first, second and third reflective units are each a reflective mirror.

15. The optical device according to claim 12, further comprising: a prism and flat glass, wherein the first reflective unit is a reflective film coated or adhered to a surface of the prism, the second reflective unit is a reflective film partly coated or adhered to a top surface of the flat glass, and the third reflective unit is a reflective film coated or adhered to a bottom surface of the flat glass.

* * * * *